(12) United States Patent
Dwivedi et al.

(10) Patent No.: US 10,061,308 B2
(45) Date of Patent: Aug. 28, 2018

(54) PARCEL DELAYERING SYSTEMS AND METHODS FOR AUTOMATIC PARCEL PROCESSING BASED ON ACCURATE DE-LAYERING

(71) Applicant: Siemens Industry, Inc., Alpharetta, GA (US)

(72) Inventors: Rajeev Dwivedi, Plano, TX (US); Michael Yaklin, Coppell, TX (US); Jocelyn Zhu, Coppell, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/701,770

(22) Filed: Sep. 12, 2017

(65) Prior Publication Data
US 2018/0081346 A1 Mar. 22, 2018

Related U.S. Application Data

(60) Provisional application No. 62/395,626, filed on Sep. 16, 2016, provisional application No. 62/432,860, filed on Dec. 12, 2016.

(51) Int. Cl.
| | | |
|---|---|---|
| *G06F 7/00* | (2006.01) |
| *G05B 19/418* | (2006.01) |
| *B65G 59/06* | (2006.01) |
| *G05B 19/416* | (2006.01) |
| *B65G 47/31* | (2006.01) |
| *B65G 59/12* | (2006.01) |

(52) U.S. Cl.
CPC ....... *G05B 19/41865* (2013.01); *B65G 47/31* (2013.01); *B65G 59/066* (2013.01); *B65G 59/12* (2013.01); *G05B 19/416* (2013.01); *G05B 2219/45054* (2013.01); *G05B 2219/49374* (2013.01)

(58) Field of Classification Search
None
See application file for complete search history.

(56) References Cited

U.S. PATENT DOCUMENTS

| | | | |
|---|---|---|---|
| 3,227,263 A | 1/1966 | Kastenbein | |
| 5,069,440 A * | 12/1991 | Lazzarotti | B65G 47/2445 198/415 |
| 5,641,052 A | 6/1997 | Lazzarotti et al. | |

(Continued)

FOREIGN PATENT DOCUMENTS

| | | |
|---|---|---|
| DE | 1277127 B | 9/1968 |
| WO | 2011110180 A1 | 9/2011 |

*Primary Examiner* — Yolanda R Cumbess

(57) ABSTRACT

Systems, methods, and machine-readable media for delayering parcels. A parcel delayering system for automatic processing of a plurality of parcels includes a multi-stage arrangement of sequential cascading conveyors configured for de-layering the plurality of parcels. One or more of the conveyors has a high-friction belt which is inclined in a direction of travel and arranged such that a first conveyor section discharges from above onto a second conveyor section. The parcel delayering system includes a system or processor configured to progressively increase a duty cycle from stage to stage of the multi-stage arrangement of sequential cascading conveyors by adding pulsation in a velocity of the conveyors.

14 Claims, 5 Drawing Sheets

(56) References Cited

U.S. PATENT DOCUMENTS

2001/0030102 A1* 10/2001 Woltjer .................. B65G 37/02
                                                        198/388
2002/0079194 A1   6/2002 Ydoate et al.
2007/0068772 A1   3/2007 Bahr

* cited by examiner

PARCEL DELAYERING SYSTEMS AND METHODS FOR AUTOMATIC PARCEL PROCESSING BASED ON ACCURATE DE-LAYERING

CROSS-REFERENCE TO RELATED APPLICATION

This application claims the benefit of the filing dates of U.S. Provisional Patent Applications 62/395,626, filed Sep. 16, 2016, and 62/432,860, filed Dec. 12, 2016, which are hereby incorporated by reference. This application also has some subject matter in common with U.S. patent application Ser. No. 15/701,824, entitled "Cascade De-Layering" and filed concurrently herewith, which is also incorporated by reference.

TECHNICAL FIELD

The present disclosure is directed, in general, to parcel processing techniques, and, in particular, various aspects relate to a progressive, stage-based duty cycle and velocity control in conveyor-based delayering for automatic parcel processing in parcel delayering systems.

BACKGROUND OF THE DISCLOSURE

Parcels, including any mail piece or other package, can be most efficiently processed using automation equipment. Improved equipment is desirable.

SUMMARY OF THE DISCLOSURE

Various disclosed embodiments include systems, methods, and machine-readable media for delayering parcels. A parcel delayering system for automatic processing of a plurality of parcels includes a multi-stage arrangement of sequential cascading conveyors configured for de-layering the plurality of parcels. One or more of the conveyors has a high-friction belt which is inclined in a direction of travel and arranged such that a first conveyor section discharges from above onto a second conveyor section. The parcel delayering system includes a system or processor configured to progressively increase a duty cycle from stage to stage of the multi-stage arrangement of sequential cascading conveyors by adding pulsation in a velocity of the conveyors.

In various embodiments, each subsequent stage operates at a higher velocity than a previous stage. In various embodiments, a velocity of at least one of the sequential cascading conveyors is repeatedly and abruptly varied between a predetermined minimum velocity and a predetermined maximum velocity for each stage, to increase shearing between layered, inclined parcels of the plurality of parcels in each stage. In various embodiments, a first conveyor of the sequential cascading conveyors receives the plurality of parcels at an input as a multi-layer bulk flow of the parcels. In various embodiments a last conveyor of the sequential cascading conveyors outputs the plurality of parcels to an output, and the output plurality of parcels are substantially delayered into a single parcel layer.

A method for delayering a plurality of parcels includes receiving, at an input, a plurality of parcels, wherein the plurality of parcels is a multi-layer bulk flow of the parcels. The method includes transporting the plurality of parcels on a multi-stage arrangement of sequential cascading conveyors. The method includes, during transport, operating at least one of the sequential cascading conveyors at a higher duty cycle than a previous one of the sequential cascading conveyors by adding pulsation in the at least one of the sequential cascading conveyors. The method includes outputting the plurality of parcels to an output. The output plurality of parcels are substantially delayered into a single parcel layer.

Disclosed embodiments include non-transitory, computer-readable medium encoded with executable instructions that, when executed, cause a data processing system to control a parcel delayering system to receive, at an input, a plurality of parcels, wherein the plurality of parcels is a multi-layer bulk flow of the parcels. The parcel delayering system is controlled to transport the plurality of parcels on a multi-stage arrangement of sequential cascading conveyors. The parcel delayering system is controlled to, during transport, operate at least one of the sequential cascading conveyors at a higher duty cycle than a previous one of the sequential cascading conveyors by adding pulsation in the at least one of the sequential cascading conveyors. The parcel delayering system is controlled to output the plurality of parcels to an output. The output plurality of parcels are substantially delayered into a single parcel layer.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The automated processing and sorting of goods and other parcels typically involves individual actions being taken on the goods being processed, so that a plurality of items that are being processed or sorted may each be handled differently. This, in turn, necessitates individual processing.

A singulator creates a sequential flow of individual items from a bulk flow of parcels. The supply of items is often from a conveyor belt in which multiple items are commingled in 3 axes. To singulate the items, it can be important to subdivide multiple layers into single layers ("destacking" or "delayering").

According to disclosed embodiments, a sequence of controlled, metered flow conveyors, with differing duty speeds transposes a 3-dimensional parcel structure (whether an organized stack of parcels or a "pile" of parcels) into thinner layers. The duty speeds can be changed to encourage the parcels to separate from a stacked position to a delayered position.

Figure 1:
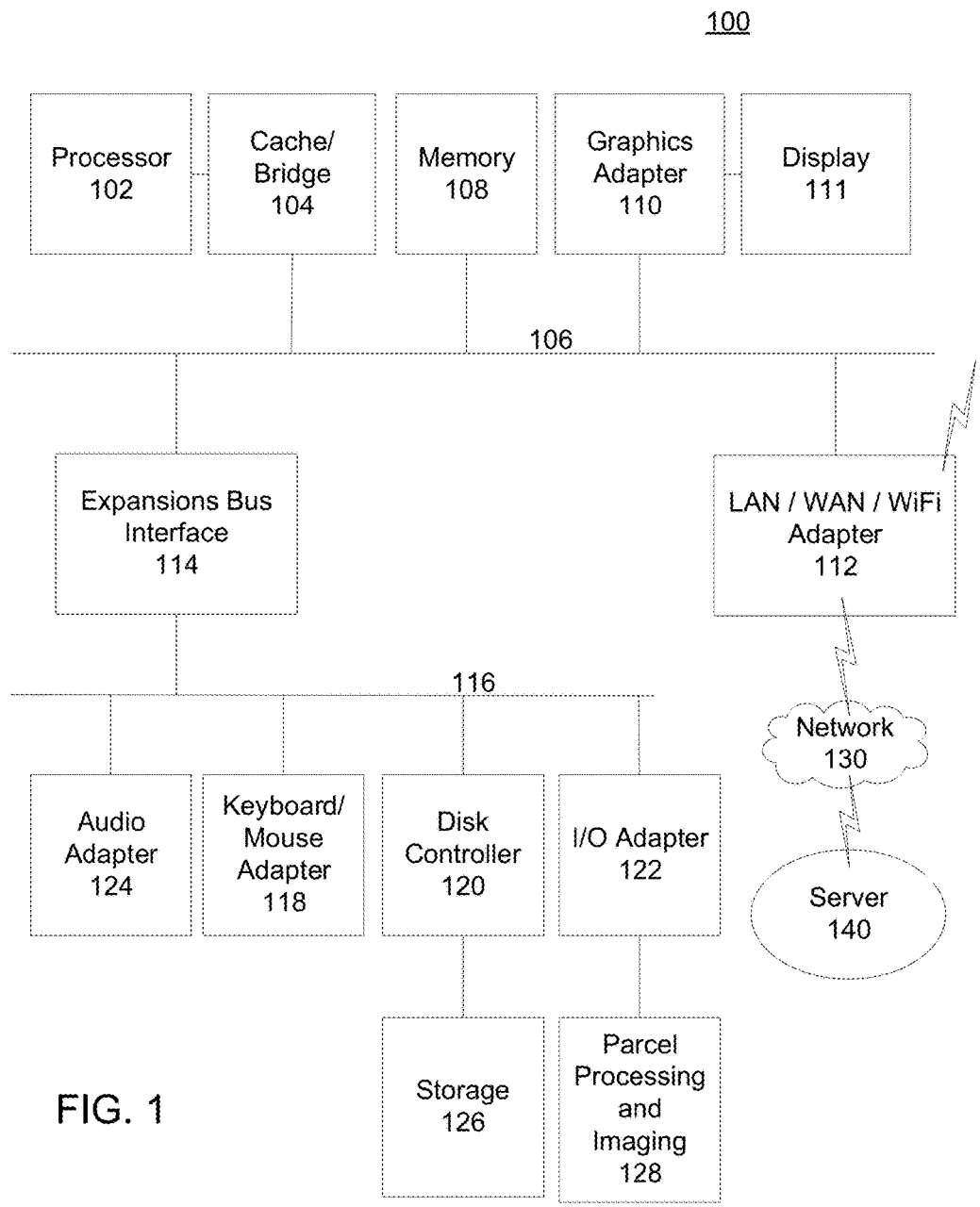
FIG. 1 depicts a block diagram of a data processing system in which an embodiment can be implemented.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to delayering system 128, as described herein, to dimension, sort, transport, and otherwise process the items in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
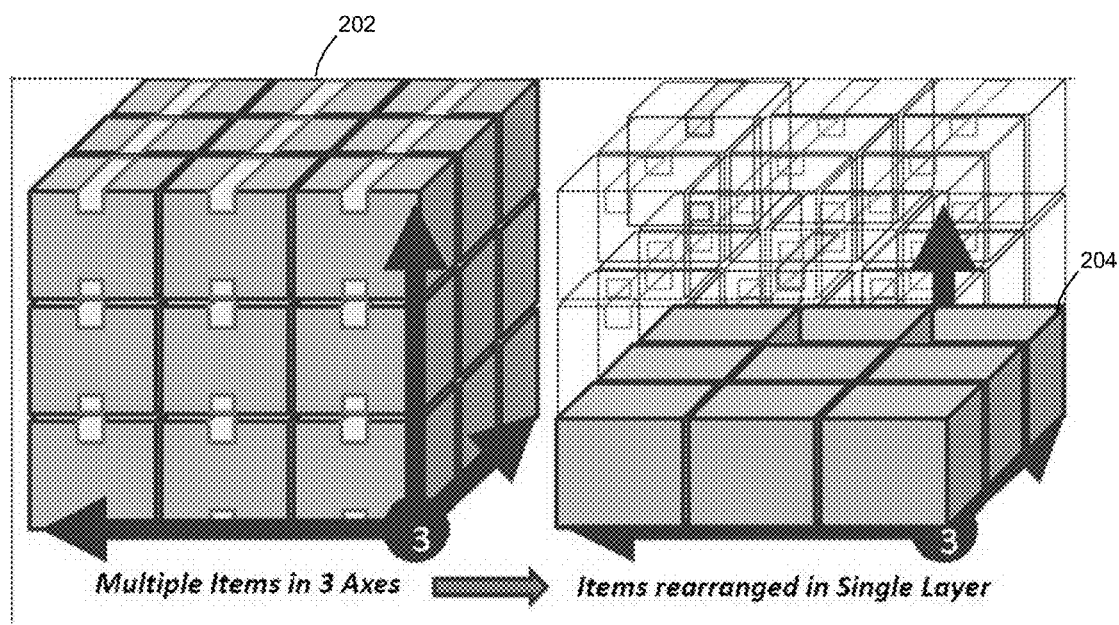
FIG. 2 generally illustrates delayering of bulk items in three dimensions into a single layer.

FIG. 2 generally illustrates delayering of bulk items in three dimensions, as shown at 202, into a single layer, as shown at 204. Different mechanical systems are typically dedicated to resolving multiple items in each axis. Disclosed embodiments perform "delayering," which represents resolution to single items in the vertical axis, i.e., a single layer. Exceptions in de-layering, where items may still be stacked despite delayering, typically cause exceptions downstream, and the cost of those exceptions often justifies human operators downstream to identify and resolve instances in which more than one item is being processed as one. Note that while the illustrative example of FIG. 2 shows an orderly stack of parcels at 202, and an orderly layer of parcels at 204, a typical delayering process is much less orderly, where a disordered stack or pile of parcels is delayered into a single disorderly layer of parcels for singulation or other further processing.

Figure 3:
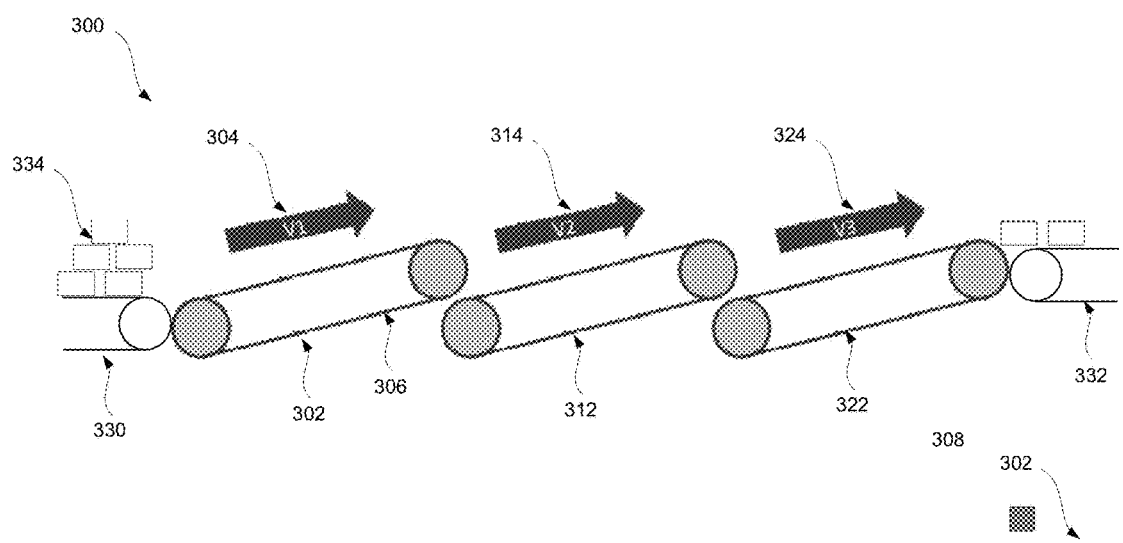
FIG. 3 illustrates an arrangement of sequential cascading conveyors used for delayering in accordance with disclosed embodiments.

FIG. 3 illustrates an example of a parcel delayering system 300 sequential cascading conveyors 302, 312, and 322 that can be used for delayering parcels 334. In this example, parcels 334 are received at an input 330, which can be an input conveyor belt or system, a chute or slide, or other structure or device that delivers a layered stream of parcels to the delayering conveyor. The parcels 334 received at input 330 can be in a multi-layer bulk flow. Note that while three cascading conveyors are shown in this example, various embodiments can use any plurality of cascading conveyors. Each of the sequential cascading conveyors can be considers a stage.

Each of the conveyors 302, 312, and 322 have high-friction belting, such as belt 306, which may be variously inclined with respect to the direction of travel. Each of the conveyors 302, 312, and 322 are generally arranged such that a first conveyor section will discharge from above onto a second section. For example, the parcels 334 on conveyor 302 drop onto conveyor 312, then drop onto conveyor 322, etc. Finally, the parcels 334 are output from the final cascading stage to an output 332, which itself can be a conveyor belt or system, a chute or slide, or other structure or device that delivers a layered stream of parcels from the delayering conveyor to the next stage of processing. At output 332, the parcels 334 are completely or substantially delayered into a single parcel layer.

Each subsequent stage typically operates at a higher speed than the previous stage; in this example, speed V3 324 of conveyor 322 can be higher than speed V2 314 of conveyor 312, which is higher than speed V1 304 of conveyor 302. As a non-limiting example, v1 can be approximately 1-110 feet/minute, V2 can be approximately 110-170 feet/minute, and v3 can be approximately 170-230 feet/minute. These examples of V1, V2, and V3 can represent the maximum surface velocity of the belts of each conveyor, while each of the conveyors also has a minimum velocity, such as approximately 40 feet/minute.

This arrangement produces effective delayering in multiple ways. For example, inclining each conveyor stage allows the force of gravity to induce shearing between layers, causing layered items to slide off of the top of items that are resting on the high friction belting. As another example, subsequent stages are designed to operate at higher speed, which increases the bandwidth of that section, so that items that had been multiple layers prior to the cascade may each find sufficient surface area to rest directly on the belt.

Disclosed embodiments use "pulsation" in velocity in the sequential cascade of conveyors 302, 312, and 322. In these embodiments, the speed of each conveyor is abruptly and repeatedly varied between a predetermined minimum velocity and a predetermined maximum velocity for each stage, which increases shearing between layered, inclined items in each stage.

Also according to disclosed embodiments, the duty cycle is increased from stage to stage. "Duty cycle," as used herein, refers to the percentage of time that the conveyor of each stage operates above its minimum predetermined velocity (typically at the maximum predetermined velocity and the time spent increasing or decreasing between the minimum predetermined velocity and the maximum predetermined velocity).

Figure 4:
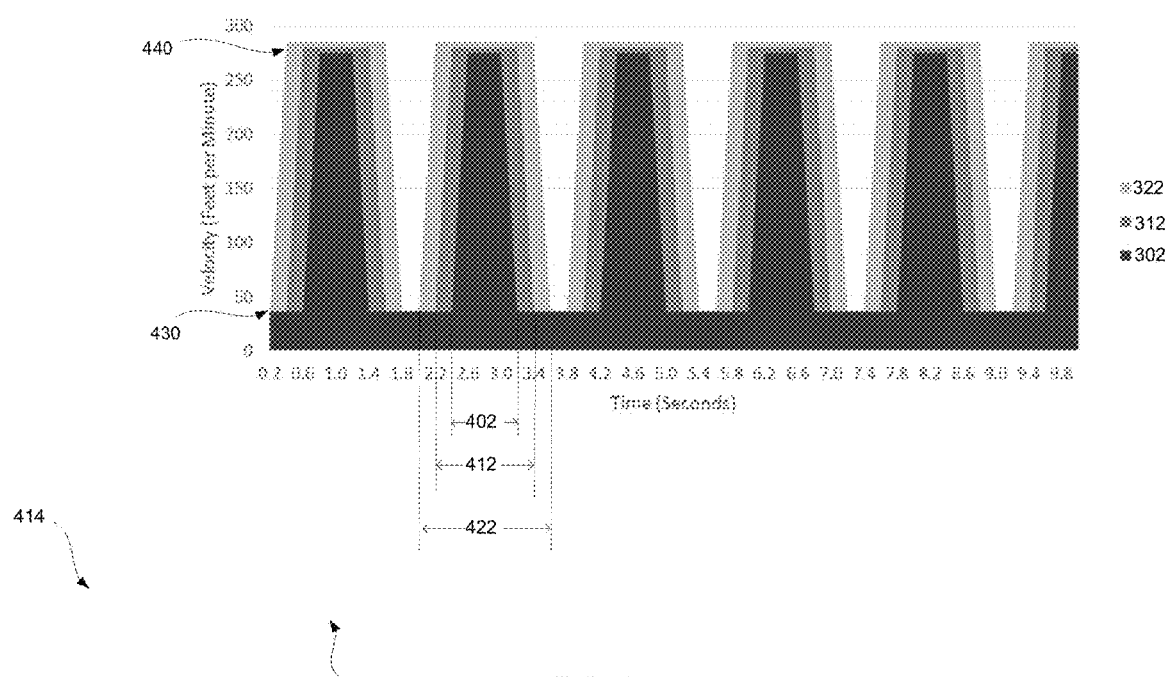
FIG. 4 illustrates an example of velocity modulation and duty cycles in delayering cascade stages in accordance with disclosed embodiments.

FIG. 4 illustrates an example of the different duty times for conveyors 302, 312, and 322 (as shown in FIG. 3). Each conveyor changes velocity between its minimum predetermined velocity 430 and its maximum predetermined velocity 440. In this example, the maximum predetermined velocity 404 of each of the conveyors is close to the same velocity. Note that duty cycle 422 of conveyor 322 is greater than duty cycle 412 of conveyor 312, which in turn is greater than duty cycle 402 of conveyor 302.

According to disclosed embodiments, "shearing" of parcels from upper layers to lower layers is caused by the inertia of items riding upon a high friction belt that is undergoing abrupt transition in speed. Some of the items have contact with the high-friction belt, while others are resting on other items, which have relatively low friction between them. This shearing force is added to the function of gravity on the inclined conveyor so that, at each stage, additional upper-layer parcels fall to lower layers, and so that the output of the delayering conveyor, the parcels are completely or substantially delayered into a single parcel layer.

Figure 5:
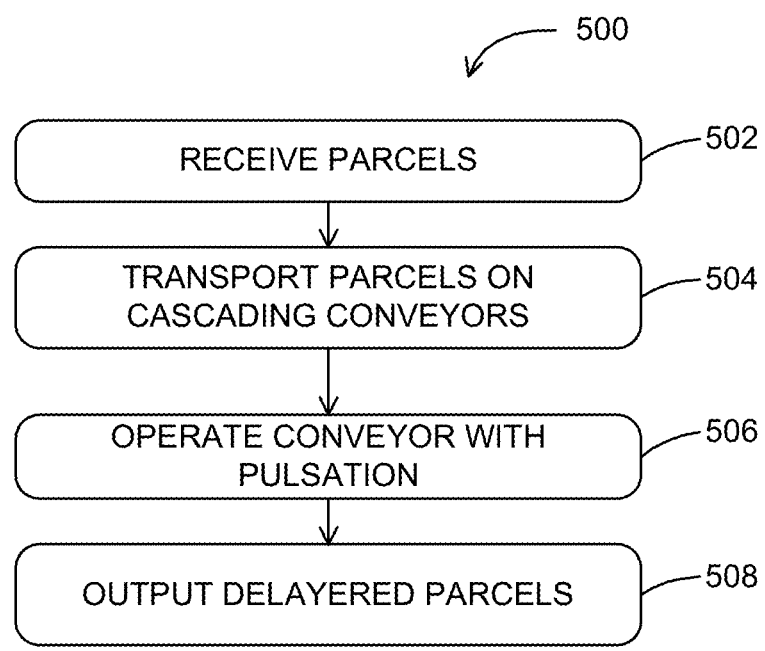
FIG. 5 illustrates a process in accordance with disclosed embodiments.

FIG. 5 illustrates a method 500 in accordance with disclosed embodiments, that can be performed, for example by a parcel delayering system as disclosed herein, which itself may be part of a parcel processing system, automation processing system, or other automated system for processing parcels and other items, referred to generically as the "system" below.

The system receives, at an input, a plurality of parcels (502). The plurality of parcels can be a a multi-layer bulk flow of the parcels.

The system transports the plurality of parcels on a multi-stage arrangement of sequential cascading conveyors configured for de-layering the plurality of parcels (504). One or more of the conveyors can have a high-friction belt which is inclined in a direction of travel and arranged such that a first conveyor section discharges from above onto a second conveyor section.

During transport, the system operates at least one of the sequential cascading conveyors at a higher duty cycle than a previous one of the sequential cascading conveyors by adding pulsation in the at least one of the sequential cascading conveyors (506). As a part of this step, the system can also operate the at least one of the sequential cascading conveyors at a higher velocity than the previous one of the sequential cascading conveyors. As a part of this step, the system can also is repeatedly and abruptly vary a velocity of at least one of the sequential cascading conveyors between a predetermined minimum velocity and a predetermined maximum velocity to increase shearing between layered, inclined parcels of the plurality of parcels in each stage.

The system outputs the plurality of parcels to an output (508). The output plurality of parcels are substantially delayered into a single parcel layer.

A tangible advantage to this improved method is improved de-layering accuracy for a system of a given size. In other words, for the same number of stages and roughly the same cost, the method reduces the proportion of exceptions (still-layered items) at the output.

Each of the elements and functions described above can be controlled by one or more processors or controllers, and in particular can be controlled by a system such as data processing system 100, to perform processes as described herein.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art. Further, the various steps described herein can be omitted or performed repeatedly, successively, concurrently, or in a different order in various embodiments.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke of 35 USC § 112(f) unless the exact words "means for" are followed by a participle.

What is claimed is:

1. A parcel delayering system for automatic processing of a plurality of parcels, the system comprising:
   a multi-stage arrangement of sequential cascading conveyors configured for de-layering the plurality of parcels, wherein one or more of the conveyors has a high-friction belt which is inclined in a direction of travel and arranged such that a first conveyor section discharges from above onto a second conveyor section, wherein each subsequent stage operates at a higher velocity than a previous stage; and
   a processor configured to progressively increase a duty cycle from stage to stage of the multi-stage arrangement of sequential cascading conveyors by adding pulsation in a velocity of the conveyors.

2. The system of claim 1, wherein a velocity of at least one of the sequential cascading conveyors is repeatedly and abruptly varied between a predetermined minimum velocity and a predetermined maximum velocity for each stage, to increase shearing between layered, inclined parcels of the plurality of parcels in each stage.

3. The system of claim 1, wherein a first conveyor of the sequential cascading conveyors receives the plurality of parcels at an input as a multi-layer bulk flow of the parcels.

4. The system of claim 1, wherein a last conveyor of the sequential cascading conveyors outputs the plurality of parcels to an output, and the output plurality of parcels are substantially delayered into a single parcel layer.

5. A method for delayering a plurality of parcels, comprising:
   receiving, at an input, a plurality of parcels, wherein the plurality of parcels is a multi-layer bulk flow of the parcels;
   transporting the plurality of parcels on a multi-stage arrangement of sequential cascading conveyors;
   during transport, operating at least one of the sequential cascading conveyors at a higher duty cycle than a previous one of the sequential cascading conveyors by adding pulsation in the at least one of the sequential cascading conveyors;
   during transport, operating the at least one of the sequential cascading conveyors at a higher velocity than the previous one of the sequential cascading conveyors; and
   outputting the plurality of parcels to an output, wherein the output plurality of parcels are substantially delayered into a single parcel layer.

6. The method of claim 5, further comprising, during transport, repeatedly and abruptly varying a velocity of at least one of the sequential cascading conveyors between a predetermined minimum velocity and a predetermined maximum velocity.

7. A method for delayering a plurality of parcels, comprising:
   receiving, at an input, a plurality of parcels, wherein the plurality of parcels is a multi-layer bulk flow of the parcels;
   transporting the plurality of parcels on a multi-stage arrangement of sequential cascading conveyors, wherein one or more of the sequential cascading conveyors has a high-friction belt which is inclined in a direction of travel and arranged such that a first conveyor section discharges from above onto a second conveyor section;
   during transport, operating at least one of the sequential cascading conveyors at a higher duty cycle than a previous one of the sequential cascading conveyors by adding pulsation in the at least one of the sequential cascading conveyors; and
   outputting the plurality of parcels to an output, wherein the output plurality of parcels are substantially delayered into a single parcel layer.

8. The method of claim 7, further comprising, during transport, operating the at least one of the sequential cascading conveyors at a higher velocity than the previous one of the sequential cascading conveyors.

9. The method of claim 7, further comprising, during transport, repeatedly and abruptly varying a velocity of at least one of the sequential cascading conveyors between a predetermined minimum velocity and a predetermined maximum velocity.

10. A non-transitory, computer-readable medium encoded with executable instructions that, when executed, cause a data processing system to control a parcel delayering system to:
    receive, at an input, a plurality of parcels, wherein the plurality of parcels is a multi-layer bulk flow of the parcels;
    transport the plurality of parcels on a multi-stage arrangement of sequential cascading conveyors;
    during transport, operate at least one of the sequential cascading conveyors at a higher duty cycle than a previous one of the sequential cascading conveyors by adding pulsation in the at least one of the sequential cascading conveyors;

during transport, operate the at least one of the sequential cascading conveyors at a higher velocity than the previous one of the sequential cascading conveyors; and output the plurality of parcels to an output, wherein the output plurality of parcels are substantially delayered into a single parcel layer.

11. The non-transitory, computer-readable medium of claim 10, wherein the parcel delayering system is further controlled to, during transport, repeatedly and abruptly vary a velocity of at least one of the sequential cascading conveyors between a predetermined minimum velocity and a predetermined maximum velocity.

12. A non-transitory, computer-readable medium encoded with executable instructions that, when executed, cause a data processing system to control a parcel delayering system to:

receive, at an input, a plurality of parcels, wherein the plurality of parcels is a multi-layer bulk flow of the parcels;

transport the plurality of parcels on a multi-stage arrangement of sequential cascading conveyors, wherein one or more of the sequential cascading conveyors has a high-friction belt which is inclined in a direction of travel and arranged such that a first conveyor section discharges from above onto a second conveyor section;

during transport, operate at least one of the sequential cascading conveyors at a higher duty cycle than a previous one of the sequential cascading conveyors by adding pulsation in the at least one of the sequential cascading conveyors; and output the plurality of parcels to an output, wherein the output plurality of parcels are substantially delayered into a single parcel layer.

13. The non-transitory, computer-readable medium of claim 12, wherein the parcel delayering system is further controlled to, during transport, operate the at least one of the sequential cascading conveyors at a higher velocity than the previous one of the sequential cascading conveyors.

14. The non-transitory, computer-readable medium of claim 12, wherein the parcel delayering system is further controlled to, during transport, repeatedly and abruptly vary a velocity of at least one of the sequential cascading conveyors between a predetermined minimum velocity and a predetermined maximum velocity.

* * * * *